United States Patent
Morisaki et al.

(10) Patent No.: US 7,523,932 B2
(45) Date of Patent: Apr. 28, 2009

(54) APPARATUS AND METHOD FOR CONVEYING SHEET MEMBER

(75) Inventors: Hiroshi Morisaki, Nishikasugai-gun (JP); Jun Morikawa, Nagoya (JP); Kazuhiro Hayamizu, Nishikamo-gun (JP); Jun Okajima, Ama-gun (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 581 days.

(21) Appl. No.: 11/128,179

(22) Filed: May 13, 2005

(65) Prior Publication Data
US 2005/0253329 A1     Nov. 17, 2005

(30) Foreign Application Priority Data
May 14, 2004    (JP)    .............................. 2004-145194

(51) Int. Cl.
B65H 5/34    (2006.01)
(52) U.S. Cl. .................................... 271/270; 271/10.03
(58) Field of Classification Search .............. 271/10.03, 271/270, 258.01; 399/396, 18, 19, 21
See application file for complete search history.

(56) References Cited

U.S. PATENT DOCUMENTS

| | | | | |
|---|---|---|---|---|
| 5,018,716 A | * | 5/1991 | Yoshida et al. | 271/227 |
| 5,299,795 A | * | 4/1994 | Miyake | 271/9.02 |
| 5,519,482 A | * | 5/1996 | Johdai et al. | 399/396 |
| 5,833,229 A | * | 11/1998 | Prim | 271/11 |
| 5,924,686 A | * | 7/1999 | Jacobson et al. | 271/3.17 |
| 6,076,821 A | * | 6/2000 | Embry et al. | 271/10.01 |
| 7,156,391 B2 | * | 1/2007 | Okamoto et al. | 271/258.01 |
| 7,275,740 B2 | * | 10/2007 | Able et al. | 271/10.01 |

FOREIGN PATENT DOCUMENTS

| JP | 5-032254 A | 2/1993 |
|---|---|---|
| JP | 7-277553 A | 10/1995 |
| JP | 8-337327 | 12/1996 |
| JP | 11-314774 A | 11/1999 |
| JP | 2000-196803 A | 7/2000 |
| JP | 2003-312867 | 11/2003 |

OTHER PUBLICATIONS

JP Office Action dtd Feb. 3, 2009, JP Appln. 2004-145194.

* cited by examiner

*Primary Examiner*—Patrick H Mackey
*Assistant Examiner*—Jeremy Severson
(74) *Attorney, Agent, or Firm*—Banner & Witcoff, Ltd.

(57) ABSTRACT

In a facsimile device, a CPU determines whether or not a recording sheet is conveyed normally based on the conveyance state detected by a detecting portion. When the CPU determines that the recording sheet has been conveyed normally, the CPU increases the conveying speed in a stepwise manner based on the current conveying speed until the conveying speed reaches maximum speed. Therefore, according to the present facsimile device, when conveyance of the recording sheet is normally performed at a specified conveying speed, the number of failures of conveyance of the recording sheet can be reduced compared to a facsimile device, in which the conveying speed is set at maximum speed of conveyance by a sheet feed roller. Also, the recording sheet can be conveyed at as high speed as possible.

20 Claims, 4 Drawing Sheets

APPARATUS AND METHOD FOR CONVEYING SHEET MEMBER

CROSS-REFERENCE TO RELATED APPLICATIONS

This application claims the benefit of Japanese Patent Application NO. 2004-145194 filed May 14, 2004 in the Japanese Patent Office, the disclosure of which is incorporated herein by reference.

BACKGROUND

The present invention relates to an apparatus and a method for conveying a plurality of sheet members one by one at a specified speed.

As a paper feeding apparatus for feeding paper within an image forming apparatus, etc, there has been conventionally known a paper feeding apparatus in which paper is fed at high speed. When paper is misfed, paper is re-fed at low speed, and subsequently paper is fed at low speed (for example, see Publication of Japanese Patent No. 3441845).

Also, there has been known a paper feeding apparatus in which paper can be fed at various speeds.

When paper is fed, paper feed is started at maximum speed. Every time paper is misfed, the paper feed speed is gradually decreased. In this apparatus, when paper is successfully fed and paper jam (state, in which paper is jammed, when paper is misfed) is cleared, the paper feed speed is returned to maximum speed (for example, see Published Publication of Unexamined Japanese Patent Application No. 2003-312867).

SUMMARY

However, in the former paper feeding apparatus, even when paper, which is difficult to be fed, is accidentally misfed, and subsequently paper, which is easy to be fed, is fed, the paper feed speed remains low. Thus, there is a problem in that it takes time to feed paper.

In the latter paper feeding apparatus, every time paper feed is finished, the paper feed speed is returned to maximum speed. Thus, the above described problem can be solved. However, for example, when a roller for feeding paper is worn out and consequently paper can not be fed at maximum speed, misfeed is repeated until the paper feed speed is adequate. Thus, there is a problem in that the number of paper misfeeds is increased.

These problems may occur on not only a paper feeding apparatus for feeding paper but also a conveying apparatus for conveying sheet members.

An object of the present invention is to overcome the above described shortcomings of the prior art and to provide a sheet member conveying apparatus which reduces the number of failures of conveyance of sheet members, and conveys the sheet members at high speed.

To attain the above and other objects, there is provided a sheet member conveying apparatus which comprises a conveying mechanism that sequentially conveys a plurality of sheet members one by one, a detecting portion that detects a conveyance state of each of the sheet members conveyed by the conveying mechanism, and a controller that sets a conveying speed at which the sheet member is conveyed based on the conveyance state of each of the sheet members detected by the detecting portion. The controller determines whether or not the sheet member has been conveyed normally based on the conveyance state detected by the detecting portion. When the controller determines that the sheet member has been conveyed normally, the controller increases the conveying speed in a stepwise manner based on a current conveying speed until the conveying speed reaches a maximum speed.

That is, the controller selects the conveying speed so that the sheet member is conveyed at a predetermined conveying speed. When the sheet member is normally conveyed at the selected conveying speed, the controller sequentially increases the conveying speed in a stepwise manner until the conveying speed reaches maximum speed.

According to the present sheet member conveying apparatus, every time the sheet member is normally conveyed at a certain conveying speed, the conveying speed is increased in a stepwise manner. Therefore, the number of failures of conveyance of the next sheet member can be reduced, compared to an apparatus in which the conveying speed is set at maximum speed immediately after the sheet member is conveyed normally.

Also, every time the sheet member is conveyed normally, the conveying speed of the sheet member is increased in a stepwise manner. Therefore, the sheet member can be conveyed at as high speed as possible.

BRIEF DESCRIPTION OF THE DRAWINGS

The present invention will now be described, by way of example, with reference to the accompanying drawings, in which.

DETAILED DESCRIPTION OF THE PREFERRED EMBODIMENT

A configuration of a facsimile device of an embodiment according to the present invention will be described.

Figure 1:
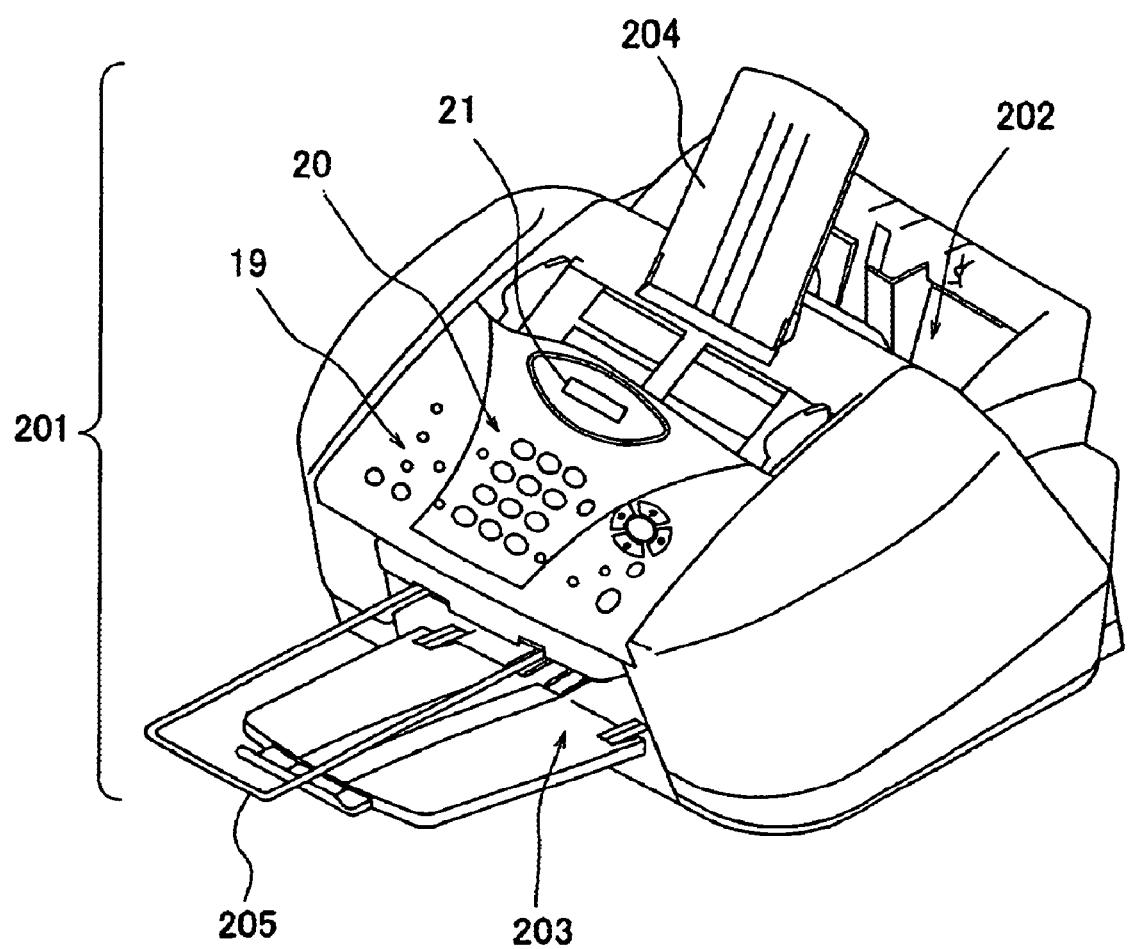
FIG. 1 is an explanatory view of an outer appearance of a facsimile device of an embodiment according to the invention.

FIG. 1 is an explanatory view of an outer appearance of a facsimile device 201. This facsimile device 201 is used to print an image data, received from another facsimile device through a telephone line, on a recording sheet 100, read the image data, printed on the recording sheet 100, using a reading portion 18 (see FIG. 3) such as a scanner or the like, and transmit the image data to still another facsimile device through the telephone line.

As shown in FIG. 1, a keyboard 20 provided with various key groups, and a panel interface 19 having a liquid crystal panel 21 or the like, are provided on the upper surface of the facsimile device 201.

The keyboard 20 is provided with, as the key groups, a dial key for performing a dial input, a recording mode selecting key for selecting a recording mode, a memory key for selecting a data memory function, a start key for starting a facsimile transmission, and a stop key for stopping the facsimile transmission.

In the facsimile device 201, a sheet stacker 202 is provided at the rear of the panel interface 19. The sheet stacker 202 can accommodate so that the recording sheets 100 are stacked in an inclined manner.

A recording sheet discharge tray 203 for holding the discharged recording sheets 100, on which a received image or literal information is printed, is provided in front of the facsimile device 201.

An inserting portion 204 for inserting an original document (sheet on which surface an image has been already formed) is provided in the middle upper part of the facsimile device 201. The original document (not-shown) inserted from the original document inserting portion 204 is taken in the facsimile device 201. The image on the original document is read by the reading portion 18. Then, the original document is discharged outside the facsimile device 201 and hold in an original document discharge tray 205. The image data read by the reading portion 18 is, for example, transmitted to another facsimile device via the telephone line, and duplicated on the recording sheet 100.

A parallel interface 24 (see FIG. 3) and a USB interface 25 (see FIG. 3), for connecting between the facsimile device 201 and a personal computer (hereinafter, referred to as PC) to transmit/receive data, are provided on the rear side surface of the facsimile device 201.

The parallel interface 24 is configured to connect a parallel cable. The USB interface 25 is configured to connect a USB cable.

Figure 2:
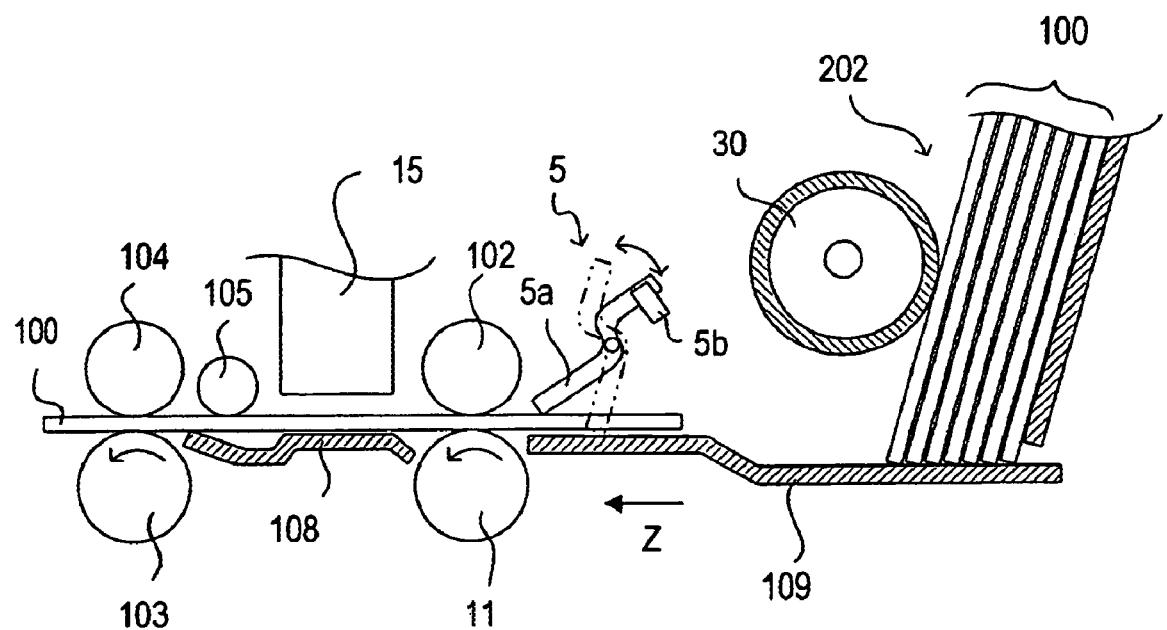
FIG. 2 is a schematic side view of each part used when a recording sheet is conveyed.

A configuration, in which the recording sheet 100 is conveyed inside the facsimile device 201, will be described with reference to FIG. 2. FIG. 2 is a schematic side view of each part used for conveyance of the recording sheet 100.

As shown in FIG. 2, the facsimile device 201 of the present embodiment comprises a recording head 15, a sheet feed roller 30, a conveying roller 11, driven rollers 102 and 104, a sheet discharge roller 103, a spur roller 105, and a detecting portion 5.

The sheet feed roller 30 is disposed so as to be in contact with a most upper surface of a plurality of recording sheets 100 piled in the sheet stacker 202. After the sheet feed roller 30 is driven, the recording sheet 100, which is in contact with the sheet feed roller 30, is conveyed sheet by sheet in a direction of a recording sheet discharge tray 203 (in a "Z" direction in FIG. 2) along a guide 109.

When the recording sheet 100, conveyed by the sheet feed roller 30, reaches the position of the conveying roller 11, the conveying roller 11 is driven in a direction in which the recording sheet 100 is further conveyed. The conveying roller 11 keeps conveying the recording sheet 100 until the rear end of the recording sheet 100 passes the conveying roller 11.

The driven roller 102 is disposed opposed to the conveying roller 11. When the recording sheet 100 is conveyed, the driven roller 102 is rotated in the state in which the recording sheet 100 is sandwiched between the driven roller 102 and the conveying roller 11.

The sheet discharge roller 103 is located closer to the recording sheet discharge tray 203 than the recording head 15, which is located closer to the recording sheet discharge tray 203 than the driven roller 102. The sheet discharge roller 103 discharges the recording sheet 100, on which the image has been formed by the recording head 15, onto the recording sheet discharge tray 203.

Figure 3:
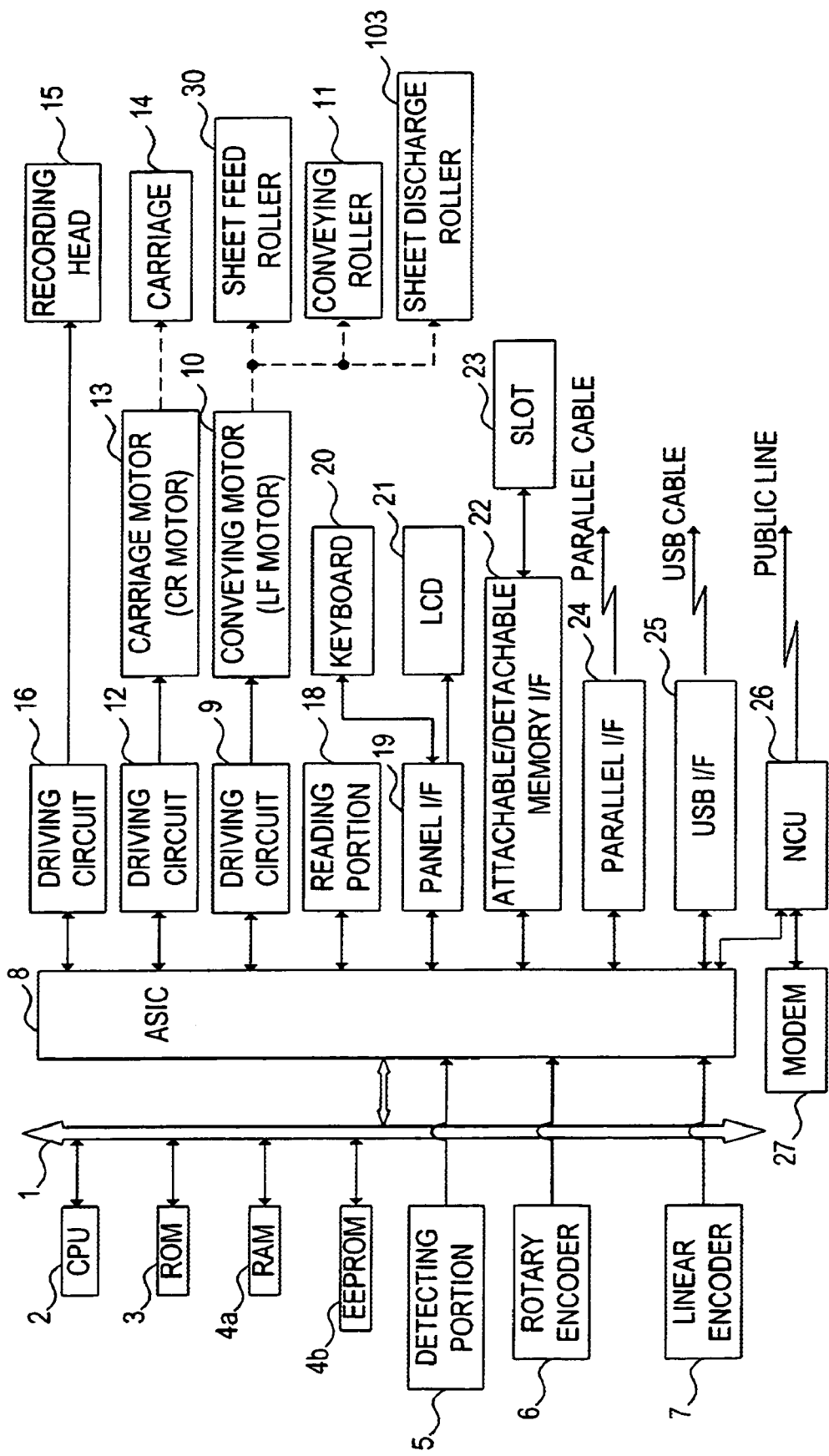
FIG. 3 is a block diagram of an electric connecting relationship of each part of the facsimile device.

The conveying roller 11, the sheet feed roller 30, and the sheet discharge roller 103 are driven by a conveying motor 10 (see FIG. 3).

The driven roller 104 is disposed opposed to the sheet discharge roller 103. When the recording sheet 100 is conveyed, the driven roller 104 is rotated in the state in which the recording sheet 100 is sandwiched between the driven roller 104 and the sheet discharge roller 103.

The spur roller 105 is located between the recording head 15 and the sheet discharge roller 103. The spur roller 105 abuts the upper surface of the recording sheet 100 and is rotated so as to press the recording sheet 100. Thus, the recording sheet 100 is inhibited from being displaced in a vertical direction.

Each of the spur roller 105 and the driven roller 104 is provided with a plurality of protrusions, whose tops are sharply angled (not-shown), on each of the outer circumferences. Each of the spur roller 105 and the driven roller 104 is configured so that only the tops of the protrusions are contacted with a recording surface (surface on which the image has been formed by the recording head 15) of the recording sheet 100. This configuration reduces the contact area between the recording surface of the recording sheet 100 and the rollers. Therefore, the recording sheet 100 can be conveyed in such a manner that the image formed on the recording sheet 100 is not contaminated.

The detecting portion 5 comprises a lever 5a, which is contacted with the moving recording sheet 100 and consequently displaced, and a sensor 5b which detects an angular position of the lever 5a. The detecting portion 5 detects the front and rear ends of the recording sheet 100. That is, when the recording sheet 100 is in the state in which the recording sheet 100 is contacted with the lever 5a, the lever 5a is displaced to the position that can be detected by the sensor 5b, as shown in the solid line in FIG. 2. Conversely, when the recording sheet 100 is in the state in which the recording sheet 100 is not contacted with the lever 5a, the lever 5a is displaced to the position that can not be detected by the sensor 5b, as shown in the chain double-dashed line in. FIG. 2. The sensor 5b detects the position of the lever 5a, and transmits the result detected by the sensor 5b to an ASIC 8 (Application Specific Integrated Circuit).

The recording head 15 is located between the conveying roller 11 and the sheet discharge roller 103. Ink is selectively ejected from printing elements (not-shown) so as to form the image on the recording sheet 100. The printing elements are provided on the undersurface of the recording head 15 and aligned in the transfer direction ("Z" direction) of the recording sheet 100.

A platen 108 is provided at the position opposed to the undersurface of the recording head 15 so that the undersurface (non-recording surface) of the recording sheet 100 transferred under the recording head 15 abuts the platen 108. Due to the platen 108, the interval between the recording sheet 100 and the recording head 15, can be stably maintained so that the accurate image can be formed.

Image formation is performed using the recording head 15 as described hereinafter.

The sheet feed roller 30 starts rotating in a clockwise direction in FIG. 2. Only a single recording sheet 100 is separated and transferred from the sheet stacker 202 of the facsimile device 201. When the front end of the recording sheet 100 is contacted with the lever 5a of the detecting portion 5, the lever 5a swings. Thus, the positional information of the recording sheet 100 is transmitted to a control system (described hereinafter). Under the control of instruction signals from the control system, conveyance of the recording sheet 100 and recording of the image is performed as described below.

In the facsimile device 201, the conveying roller 11, rotated and driven by the conveying motor 10, and the driven roller 102, driven and rotated by the rotation of the conveying roller 11, sandwich the recording sheet 100 to be transferred to a specified position where the recording head 15 is disposed. Subsequently, the recording head 15 is moved in a main scanning direction (vertical direction with respect to the sheet in FIG. 2), and ink is selectively ejected from the recording head 15 onto the recording sheet 100 so as to form the image on the recording sheet 100.

When a series of images are formed on the recording sheet 100, the facsimile device 201 alternately repeats a conveying operation, in which the recording sheet 100 is conveyed in a sub-scanning direction ("Z" direction) by the conveying roller 11, and an image forming operation by the recording head 15. In the image forming operation, a CPU 2 and an ASIC 8 (described hereinafter), move the recording head 15 in the main scanning direction (direction perpendicular to the sub-scanning direction on the recording surface of the recording sheet 100), and make the recording head 15 selectively eject ink.

In this case, the ASIC 8 controls the drive amount of the conveying motor 10 based on the length of the printing element train and the diameter of the conveying roller 11. Thus, the conveying amount, in which the recording sheet 100 is conveyed in the sub-scanning direction by the conveying roller 11, coincides with the width in the sub-scanning direction of the image which is formed on the recording sheet 100 by a single main scanning of the recording head 15.

A control system of the facsimile device 201 will be described with reference to FIG. 3. FIG. 3 is a block diagram of an electric connecting relationship of each part of the facsimile device 201.

Based on operation of the panel interface 12 by a user and data transmitted through the telephone line, the control system controls conveyance of the recording sheet 100 and recording conditions of the received image. Furthermore, the control system receives an inputted instruction to perform facsimile transmission of an original document to be transmitted, and controls reading and conveyance, etc, of the original document.

The control system is configured as a microcomputer having a CPU 2, a ROM 3, a RAM 4a, and an EEPROM 4b. The control system is connected to the ASIC 8 via a bus 1.

The ASIC 8 is connected to various driving circuits, the reading portion 18, a NCU 26 (Network control Unit), a memory interface 22 provided with a slot 23 for disposing a magnetic disc or the like in an attachable/detachable manner that can record the transmitted and received data, the panel interface 19, the parallel interface 24, and the USB interface 25, etc.

Furthermore, the ASIC 8 is connected to a rotary encoder 6 provided to the conveying roller 11 or the conveying motor 10 so as to detect the rotating amount of the conveying roller 11, a linear encoder 7 for detecting the conveying amount of a carriage 14, and the detecting portion 5, etc.

The ROM 3 stores a communication control program of the facsimile device 201, a various function control program inputted from the panel interface 19, and reading and recording programs as facsimile functions.

The RAM 4a is a volatile memory and used to store various data that is used by the CPU 2 at the time of execution of these programs. Specifically, the number of retry attempts "n" (data of the number of abnormal conveyances) used in a conveying process (described hereinafter) is stored in the RAM 4a.

The EEPROM 4b is a non-volatile memory and used to store an initial value, etc, that is necessary at the time of the image formation. Specifically, the number of consecutive successes "k" (data of the number of normal conveyance), a setting value of the number of retry attempts "n" (second setting number), a value of a conveying speed number "i", a candidate of a conveying speed "Vi" corresponding to the value of the conveying speed number "i", and a setting value of the number of consecutive successes "k" (first setting number), which are used in the conveying process (described hereinafter), are stored in the EEPROM 4b.

Each of the setting value of the number of retry attempts "n", the candidate of the conveying speed "Vi", and the setting value of the number of consecutive successes "k", which are stored in the RAM 4a and the EEPROM 4b, can be set by operation of the keyboard 20 by a user.

In the conveying process (described hereinafter), the setting value of the number of retry attempts "n" is 3. The candidate of the conveying speed "Vi" has ten levels from "V0" to "V9" (V0 is the highest speed. V9 is the lowest speed). The setting value of the number of consecutive successes "k" is 5. The initial recorded value of the value of the conveying speed number "i" is 5. The initial recorded value of the number of consecutive successes "k" is 0.

The NCU 26 transmits communication signals, demodulated by a MODEM 27 and inputted from the public line, to the ASIC 8. When data of the original document to be transmitted is transmitted outside, the NCU 26 receives the instructions from the ASIC 8, demodulates the data of the original document to be transmitted via the MODEM 27, and outputs communication signals to the public line.

The ASIC 8 receives the instructions from the CPU 2 and generates, for example, phase excitation signals for energizing the conveying motor 10 and transmits to the driving circuit 9 of the conveying motor 10 and the driving circuit 12 of the carriage motor 13. Driving signals are transmitted to the conveying motor 10 and a carriage motor 13 via the driving circuits 9 and 12. Thus, rotation and stop of the conveying motor 10 and the carriage motor 13 is controlled.

The driving circuit 9 is for driving the conveying motor 10 connected to the conveying roller 11. The driving circuit 9 drives the conveying roller 11, so that the recording sheet 100 is conveyed in the sub-scanning direction.

The driving circuit 12 is for driving the carriage motor 13 that moves the carriage 14 provided with the recording head 15 in the main scanning direction. The driving circuit 12 drives the carriage motor 13, so that the carriage 14 is moved in the main scanning direction and the recording head 15 provided to the carriage 14 is moved in the main scanning direction.

A driving circuit 16 is for moving the recording head 15 upwardly/downwardly so that the recording head 15 approaches/retreats in a direction opposed to the recording sheet 100, and making the recording head 15 eject ink onto the recording sheet 100 at a predetermined timing. The driving circuit 16 receives the signals generated and outputted in the ASIC 8 based on the driving control procedure outputted from the CPU 2. Thus, the driving circuit 16 drives and controls the recording head 15.

When the recording sheet 100 is conveyed by the sheet feed roller 30, the conveying roller 11, and the sheet discharge roller 103, it is preferable that the conveying speed "Vi" is higher as long as the speed of the image forming operation by the recording head 15 permits. When the conveying speed "Vi" is too high, a slip or the like may occur on the contact surfaces between each roller and the recording sheet 100, and the recording sheet 100 may not be properly conveyed by each roller. Therefore, in the present embodiment, whether or not the recording sheet 100 is normally conveyed by the sheet feed roller 30 is determined, thereby optimizing the rotating speed of each roller upon conveyance of the recording sheet 100.

Figure 4:
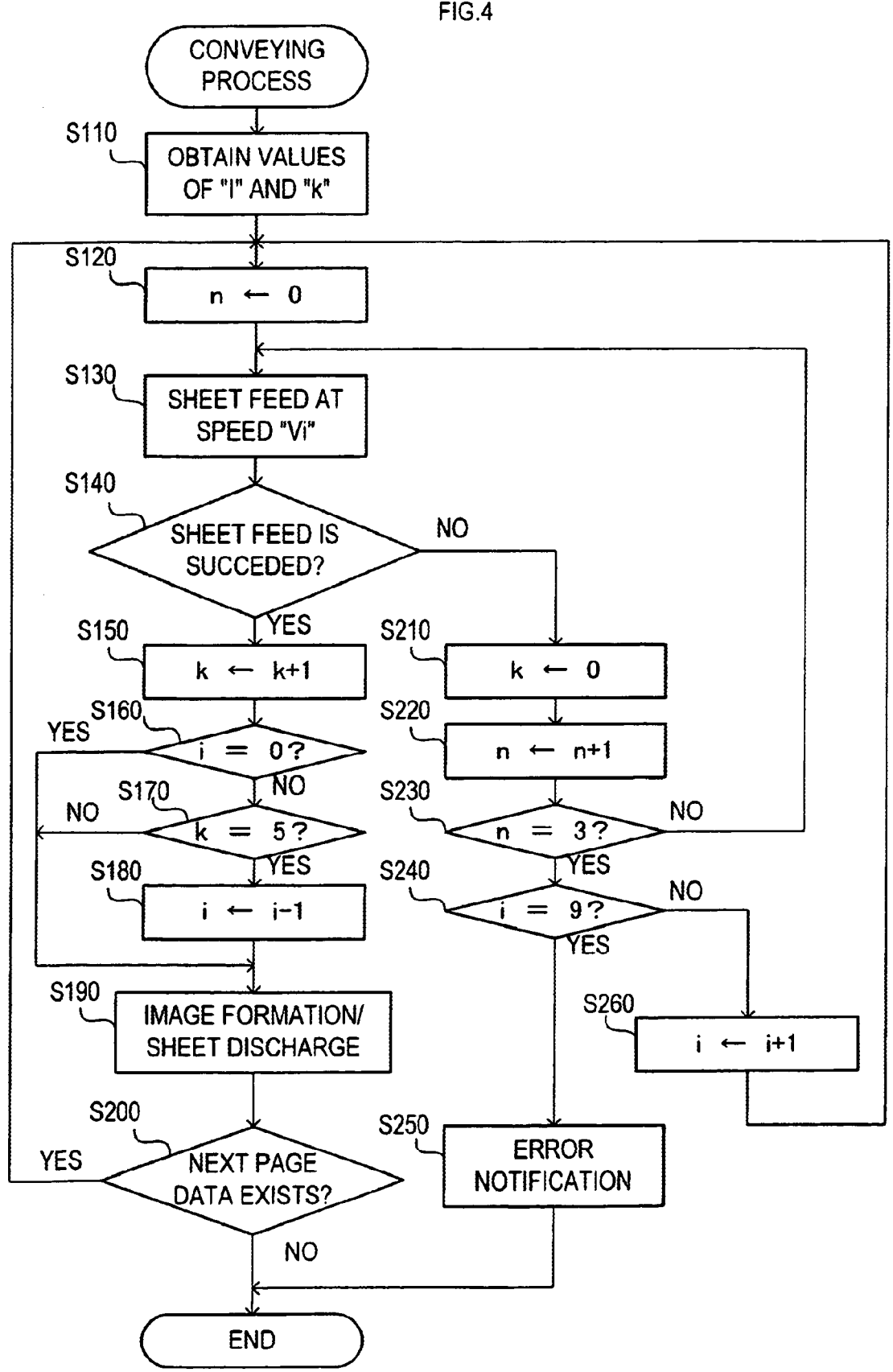
FIG. 4 is a flow chart showing a conveying process.

This conveying process will be described with reference to FIG. 4. FIG. 4 is a flowchart showing a conveying process performed by the CPU 2.

In the conveying process, after the ASIC 8 receives a record demand, first in S110, the values of the conveying speed number "i" and the number of consecutive successes "k" stored in the EEPROM 4b are obtained.

In S120, the value of the number of retry attempts "n" is set at 0.

In S130 the conveying speed "Vi" corresponding to the current conveying speed number "i" is obtained from the EEPROM 4b. The sheet feed roller 30 is driven based on the conveying speed "Vi" that has been obtained. Thus, feed and conveyance of the recording sheet 100 piled in the sheet stacker 202 is started.

In S140, whether or not the sheet feed has succeeded is determined. That is, in this process, timing, in which the recording sheet 100 is detected by the detecting portion 5, is calculated based on the drive amount of the conveying motor 10. If the recording sheet 100 is detected in this timing, it is determined that the sheet feed has succeeded. If the recording sheet 100 is not detected, it is determined that the sheet feed has failed. In S140, if it is determined that the sheet feed has succeeded, the processing in S150 is performed. If it is determined that the sheet feed has failed, the processing in S210 is performed.

In S150, if it is determined in S140 that the sheet feed has succeeded, the value of the number of consecutive successes "k" is incremented by 1.

In S160, whether or not the value of the conveying speed number "i" is 0 (i.e. maximum conveying speed) is determined. If it is determined the value of the conveying speed number "i" is 0, the processing in S190 is performed. If it is determined that the value of the conveying speed number "i" is not 0, the processing in S170 is performed.

In S170, whether or not the value of the number of consecutive successes "k" is 5 (setting value) is determined. If it is determined that the value of the number of consecutive successes "k" is not 5, the processing in S190 is performed immediately. If it is determined that the value of the number of consecutive successes "k" is 5, the value of the conveying speed number "i" is decremented by 1 in S180 and then the processing in S190 is performed. That is, in S180, the conveying speed "Vi" is increased by one level.

In S190, the conveying roller 11, the sheet discharge roller 103, the recording head 15, etc are driven to perform the image forming operation. Thus, the image is formed on the recording sheet 100.

In S200, whether or not the image data to be recorded on the next recording sheet 100 exists is determined. If it is determined that the image data exists, the processing in S120 is performed. If it is determined that the image data does not exist, this conveying process is terminated.

On the other hand, if it is determined in S140 that the sheet feed has failed, the processing in S210 is performed as described above. In S210, the number of consecutive successes "k" is set at 0.

In S220, the value of the number of retry attempts "n" is incremented by 1.

In S230, whether or not the number of retry attempts "n" is 3 (setting value) is determined. If it is determined that the number of retry attempts "n" is 3, the processing in S240 is performed. If it is determined that the value of the number of retry attempts "n" is not 3, the processing in S130 is performed again.

In S240, if it is determined in S230 that the value of the number of retry attempts "n" is 3, whether or not the value of the conveying speed number "i" is 9 (minimum speed) is determined. If it is determined the value of the conveying speed number "i" is not 9, the value of "i" is incremented by 1 in S260. The processing in S120 is performed again.

On the other hand, if it is determined that the value of the transfer speed number "i" is 9, the conveying speed can not be decreased any further in the current state. Therefore, an error is provided on the liquid crystal panel 21 in S250, and the conveying process is terminated.

In the facsimile device 201 as described above, the CPU 2 determines whether or not the recording sheet 100 is normally conveyed based on the detection result by the detecting portion 5. When the CPU 2 determines that the recording sheet 100 has been conveyed normally, the CPU 2 increases the conveying speed "Vi" in a stepwise manner based on the current conveying speed "Vi" until the conveying speed "Vi" reaches the maximum conveying speed.

Therefore, according to the present facsimile device 201, the number of failures of conveyance of the recording sheet 100 can be reduced, compared with a device, in which the conveying speed "Vi" is immediately increased to maximum speed of conveyance by the sheet feed roller 30, after the recording sheet 100 is normally conveyed at a certain transfer speed "Vi".

Every time the recording sheet 100 is conveyed normally, the conveying speed "Vi" of the recording sheet 100 is increased in a stepwise manner. Thus, the recording sheet 100 can be conveyed at as high speed as possible.

According to the facsimile device 201, the value of the number of consecutive successes "k", which represents the number of consecutive normal conveyance of the recording sheet 100 performed by the sheet feed roller 30, is recorded in the EEPROM 4b. The CPU 2 updates the value of the number of consecutive successes "k" recorded in the EEPROM 4b based on the determination result whether or not the recording sheet 100 has been conveyed normally. In the case in which the value of the number of consecutive successes "k" is the same as a predetermined setting value of the number of consecutive successes "k", the CPU 2 increases the conveying speed "Vi" at which the next recording sheet 100 is conveyed by the sheet feed roller 30 more than the current conveying speed "Vi".

Even if conveyance of the recording sheet 100 is succeeded accidentally, the conveying speed "Vi" is not increased unless the conveyance is consecutively succeeded the same number of times as the setting value of the number of consecutive successes "k". Therefore, the recording sheet 100 can be conveyed more reliably.

Furthermore, if the CPU 2 determines that the recording sheet 100 has not been conveyed normally, the CPU 2 decreases the conveying speed "Vi" in a stepwise manner until the conveying speed "Vi" reaches the minimum conveying speed.

When the recording sheet 100 is conveyed abnormally, the conveying speed "Vi" of the sheet feed roller 30 is decreased to the speed at which the recording sheet 100 can be conveyed by the sheet feed roller 30. Therefore, the recording sheet 100 can be conveyed reliably.

The setting value of the number of retry attempts "n", which represents the number of consecutive abnormal conveyance of the recording sheet 100 performed by the sheet feed roller 30, is stored in the EEPROM 4b. The CPU 2 updates the value of the number of retry attempts "n" recorded in the RAM 4a based on the determination result whether or not the recording sheet 100 has been conveyed normally. In the case in which the value of the number of retry attempts is the same as a predetermined setting value of the number of retry attempts "n", the CPU 2 decreases the conveying speed "Vi" at which the recording sheet 100 is conveyed by the sheet feed roller 30 more than the current conveying speed "Vi".

Even if conveyance of the recording sheet 100 is failed accidentally, the conveying speed "Vi" is not decreased unless the conveyance is consecutively failed the same number of times as the setting value of the number of retry attempts "n". Therefore, the recording sheet 100 can be conveyed at relatively higher speed.

According to the facsimile device 201, a plurality of the conveying speeds "Vi" at which the recording sheet 100 is conveyed by the sheet conveying roller 30, are provided in a stepwise manner. These conveying speeds "Vi" can be restored in the EEPROM 4b. If the CPU 2 determines that the current conveying speed "Vi" is the minimum conveying speed and it is needed to decrease the conveying speed "Vi" more, an error of conveyance of the recording sheet 100 is provided.

Since abnormality of the facsimile device 201 can be identified, necessity of repair and maintenance can be provided to a user and a service center.

The CPU selects and sets the conveying speed "Vi" at which the recording sheet 100 is conveyed by the sheet conveying roller 80 from a plurality of conveying speeds "Vi" stored in the conveying speed storage portion.

Therefore, according to the facsimile device 201, whatever kind of material the recording sheet 100 is constituted by, the recording sheet 100 can be conveyed at the optical conveying speed "Vi" selected from the conveying speeds "Vi" recorded in the conveying speed storage portion.

Also, the facsimile device comprises a keyboard 20 which can set at least one of a plurality of the conveying speeds "Vi" recorded in the EEPROM 4b, the number of the first and second settings numbers stored in the first and second number storage portions, and the number of levels of the conveying speeds "Vi" by which the conveying speed "Vi" is increased or decreased.

Therefore, a user can set operating conditions of the facsimile device 201 using the keyboard 20. Therefore, the recording sheet 100 can be favorably conveyed under the appropriate operating conditions corresponding to the secular change or the like of the sheet feed roller 30.

Furthermore, the value of the conveying speed number "i" and the value of the number of consecutive successes "k" are stored in the EEPROM 4b which is a non-volatile memory.

Therefore, even if the power of the facsimile device 201 is turned off, the contents stored in the EEPROM 4b is retained. Thus, when the power of the facsimile device 201 is turned on again, the facsimile device 201 can immediately perform the optimal conveying operation.

The invention is not restricted to the embodiment as described above, and may be practiced or embodied in still other ways without departing from the subject matter thereof.

For example, in the above embodiment, it is configured so that the recording sheet 100 (regular paper, thermal paper, and glossy paper, etc) is used as a sheet member. However, an OHP sheet, etc may be used.

The present invention is applied to the conveying apparatus, to be used when the recording sheet 100 is conveyed from the sheet stacker 202 to the recording sheet discharge tray 203. However, for example, the present invention may be applied to a conveying apparatus, to be used when the original document is conveyed from the original document inserting portion 204 to the original document discharge tray 205.

In the present embodiment, the CPU 2 optimizes the rotating speed of each roller based on the determination result whether or not the recording sheet 100 has been normally conveyed by the sheet feed roller 30. However, the CPU 2 may optimize the rotating speed of each roller based on the determination result whether or not the recording sheet 100 has been normally conveyed by the conveying roller 11 and the sheet discharge roller 103.

The values of the conveying speed number "i" and the number of consecutive successes "k" are stored in the EEPROM 4b in the conveying process. However, the values of the conveying speed number "i" and the number of consecutive successes "k" may be stored in the RAM 4a. In this case, the values of the conveying speed number "i" and the number of consecutive successes "k" are reset to the specified values (for example, the middle conveying speed number "i" is 5, and the number of consecutive successes "k" is 0), when the facsimile device 201 is powered on. Therefore, for example, even if an error occurs, the error state is not saved. Thus, the effect of the error can be removed.

The initial conveying speed "Vi" in the conveying process of the present embodiment is V5 which is the middle conveying speed. However, the initial conveying speed "Vi" may be an arbitrary conveying speed "Vi". That is, the initial conveying speed "Vi" may be the maximum conveying speed "V0", or the minimum conveying speed "V9". However, when material such as glossy paper or OHP sheet, on which scratches are easily made, is used as a sheet member, it is preferable that the initial conveying speed "Vi" is set at the middle conveying speed "Vi" (for example, V4 to V6). This is because, when the sheet material is conveyed at too high speed (for example, at the maximum conveying speed "V0"), scratches are easily made on the sheet member, if the material can not be conveyed normally. When the sheet member is conveyed at too low speed (for example, at the minimum conveying speed "V9"), it takes time until the conveying speed is high. Therefore, by setting the initial conveying speed "Vi" at the middle conveying speed "Vi", this sheet member can be conveyed favorably, even if the sheet member, on which scratches are easily made, is used. Also, in order to even out the conveying performance when the facsimile device 201 is mass-produced, it is preferable that the initial conveying speed "Vi" is set at the middle conveying speed "Vi" (for example, V4 to V5).

The speed of conveyance of the sheet member varies in accordance with the material (kind) of the sheet member. Therefore, the initial conveying speed "Vi" may be changed in accordance with the material of the sheet member to be conveyed. Specifically, the initial conveying speed number "i" (for example, 6) for the recording sheet 100 and the initial conveying speed number "i" (for example, 4) for the OHP sheet are preliminarily stored in the EEPROM 4b. By operating the keyboard 20, a user may select and change the material of the sheet member to be conveyed (i.e. which initial conveying speed number "i" is selected to perform the conveying process). This enables higher and more appropriate conveying speed.

The table, in which the conveying speed "Vi" referred to by the CPU 2 in the conveying process is stored, is preliminarily stored in the EEPROM 4b. However, the table may be re-written by operation of the keyboard 20 when the facsimile device 201 is in a stand by state. Due to this configuration, the conveying speed "Vi" or the like can be set based on the user's request.

In the present embodiment, the CPU 2 selects the speed which is different by 1 level from the speed candidates stored in the EEPROM 4b. However, the CPU 2 may select a predetermined conveying speed "Vi" that is different by a plurality of levels. Due to this configuration, the change rate of the conveying speed "Vi" before/after change in the conveying speed can vary in accordance with the state of the facsimile device 201. Therefore, the time until the optimal speed is set can be reduced, When conveyance of the recording sheet 100 is failed, the same recording sheet 100 is conveyed again. However, the recording sheet 100, which has failed to be conveyed, may be removed.

In S250 in the conveying process, the error is displayed (provided) on the liquid crystal panel 21. In this case, the error may be provided to facilities such as a service center via the telephone line.

In the conveying process, whether or not the number of consecutive successes reaches a setting value is determined in S170. However, for example, the number of successes of conveyance in the nearest ten times may be stored. Whether or not the frequency of successes (chances) exceeds a predetermined value may be determined.

The number of retry attempts "n", the number of consecutive successes "k" and the conveying speed "Vi" can be all stored in a single memory. The number of retry attempts "n", the number of consecutive successes "k" and the conveying speed "Vi" can be respectively stored in different separate memories. Two of the number of retry attempts "n", the number of consecutive successes "k" and the conveying speed "Vi" can be stored in a single memory and the remaining one can be stored in a different separate memory.

These configurations can obtain the same effect as the above described embodiment.

What is claimed is:

1. A sheet member conveying apparatus comprising:
   a conveying mechanism that sequentially conveys a plurality of sheet members one by one;
   a detecting portion on that detects a conveyance state of each of the sheet members conveyed by the conveying mechanism;
   a controller that sets a conveying speed at which the sheet member is conveyed by the conveying mechanism based on the conveyance state of each of the sheet members detected by the detecting portion, wherein the controller determines whether or not the sheet member has been conveyed normally based on the conveyance state detected by the detecting portion, and increases the conveying speed in a stepwise manner to a conveying speed at which a next sheet member is conveyed by the conveying mechanism based on a current conveying speed until the conveying speed reaches a maximum speed, when the controller determines that the sheet member has been conveyed normally;
   a first number storage portion that stores data of the number of normal conveyance which represents the number of consecutive normal conveyance of the sheet member performed by the conveying mechanism, and
   wherein the controller updates the data of the number of normal conveyance stored in the first number storage portion based on the determination result of whether or not the sheet member has been conveyed normally, and increases the conveying speed at which the next sheet member is conveyed by the conveying mechanism more than the current conveying speed, when the data of the number of normal conveyance is a predetermined first setting number.

2. The sheet member conveying apparatus according to claim 1, wherein the controller decreases the conveying speed to a conveying speed at which the next sheet member is conveyed by the conveying mechanism in a stepwise manner based on the current conveying speed until the conveying speed reaches a minimum conveying speed, when the controller determines that the sheet member has not been conveyed normally.

3. The sheet member conveying apparatus according to claim 2, further comprising:
   a second number storage portion that stores data of the number of abnormal conveyance which represents the number of consecutive abnormal conveyance of the sheet member performed by the conveying mechanism,
   wherein the controller updates the data of the number of abnormal conveyance stored in the second number storage portion based on the determination result whether or not the sheet member has been conveyed normally, and decreases the conveying speed at which the next sheet member is conveyed by the conveying mechanism at which the next sheet member is conveyed by the conveying mechanism more than the current conveying speed, when the data of the number of abnormal conveyance is a predetermined second setting number.

4. The sheet member conveying apparatus according to claim 3, wherein when the controller decreases the conveying speed, the controller provides an error of conveyance of the sheet member if the current speed is the minimum conveying speed.

5. The sheet member conveying apparatus according to claim 3, further comprising:
   a conveying speed storage portion that stores a plurality of levels of the conveying speeds,
   wherein the controller selects and sets the conveying speed at which the sheet member is conveyed by the conveying mechanism from the plurality of levels of the conveying speeds stored in the conveying speed storage portion.

6. The sheet member conveying apparatus according to claim 5, wherein the controller selects the conveying speed which is different by a predetermined number of levels from the current conveying speed, when the controller selects the conveying speed from the plurality of levels of conveying speeds stored in the conveying speed storage portion.

7. The sheet member conveying apparatus according to claim 6, further comprising:
   a setting portion configured to set at least one of the plurality of levels of conveying speeds stored in the conveying speed storage portion, the first and second setting numbers, and the predetermined number of levels of the conveying speed.

8. The sheet member conveying apparatus according to claim 7, wherein at least one of the first number storage portion, the second number storage portion, and the conveying speed storage portion is a non-volatile memory.

9. The sheet member conveying apparatus according to claim 7, wherein at least one of the first number storage portion, the second number storage portion, and the conveying speed storage portion is a volatile memory.

10. The sheet member conveying apparatus according to claim 7, wherein each of the first number storage portion, the second number storage portion, and the conveying speed storage portion is integrated.

11. The sheet member conveying apparatus according to claim 7, wherein each of the first number storage portion, the second number storage portion, and the conveying speed storage portion is separated.

12. The sheet member conveying apparatus according to claim 1, wherein conveyance of the next sheet member is not started until the conveyance state of the conveyed sheet member is detected.

13. A sheet member conveying method comprising:
   conveying a sheet member;
   detecting a conveyance state of the conveyed sheet member; and setting a conveying speed at which the next sheet member is conveyed based on the conveyance state of the detected sheet member, wherein whether or not the sheet member has been normally conveyed is determined based on the detected conveyance state, and when it is determined that the sheet member has been conveyed normally, the conveying speed is increased in a stepwise manner based on a current conveying seed until the conveying speed reaches a maximum speed, wherein in the conveying speed setting step, the number of normal conveyance that represents the number of consecutive normal conveyance of the sheet member performed in the conveying step, is updated and stored in a first number storage portion based on the determination result whether or not the sheet member has been conveyed normally, and the conveying speed at which the next sheet member is conveyed by a conveying mechanism is increased more than the current speed, when the data of the number of normal conveyance is a predetermined first setting number.

14. The sheet member conveying method according to claim 13, wherein in the conveying speed setting step, the conveying speed is decreased in a stepwise manner based on the current conveying speed until the conveying speed reaches a minimum conveying speed, when it is determined that the sheet member has not been conveyed normally.

15. The sheet member conveying method according to claim 14, wherein in the conveying speed setting step, the number of abnormal conveyance that represents the number of consecutive abnormal conveyance of the sheet member performed in the conveying step is updated and stored in a second number storage portion based on the determination result of whether or not the sheet member has been conveyed normally, and the conveying speed at which the next sheet member is conveyed by the conveying mechanism is decreased more than the current speed, when the data of the abnormal conveyance is a predetermined second setting number.

16. The sheet member conveying method according to claim 15, further comprising:

when the conveying speed is decreased in the conveying speed setting step, providing an error of conveyance of the sheet member if the current conveying speed is the minimum conveying speed.

17. The sheet member conveying method according to claim 15, wherein in the conveying speed setting step, the conveying speed at which the conveying mechanism conveys the sheet member is selected and set from the plurality of levels of conveying speeds stored in a conveying speed storage portion.

18. The sheet member conveying method according to claim 17, wherein in the conveying speed setting step, the conveying speed which is different by a predetermined number of levels from the current conveying speed is selected, when the conveying speed is selected from the plurality of levels of conveying speeds stored in the conveying speed storage portion.

19. The sheet member conveying method according to claim 18, comprising:

setting at least one of the plurality of levels of conveying speeds stored in the conveying speed storage portion, the first and second setting numbers, and the predetermined number of levels of the conveying speed before the conveying step.

20. The sheet member conveying method according to claim 13, wherein conveyance of the next sheet member is not started until the conveyance state of the conveyed sheet member is detected.

* * * * *

UNITED STATES PATENT AND TRADEMARK OFFICE
CERTIFICATE OF CORRECTION

| | | |
|---|---|---|
| PATENT NO. | : 7,523,932 B2 | Page 1 of 1 |
| APPLICATION NO. | : 11/128179 | |
| DATED | : April 28, 2009 | |
| INVENTOR(S) | : Hiroshi Morisaki et al. | |

It is certified that error appears in the above-identified patent and that said Letters Patent is hereby corrected as shown below:

On the cover page, References Cited item (56), Foreign Patent Documents:
  Please replace "JP   5-032254   A   2/1993" with --JP   5-32354   A   2/1993--

Signed and Sealed this

Twenty-seventh Day of October, 2009

David J. Kappos
*Director of the United States Patent and Trademark Office*